(12) United States Patent
Hwang et al.

(10) Patent No.: US 8,065,557 B2
(45) Date of Patent: Nov. 22, 2011

(54) APPARATUS FOR MANAGING DATA BACKUP

(75) Inventors: Juncheol Hwang, Anyang-si (KR); Seunghoon Shin, Seoul (KR)

(73) Assignee: Korea I.O. Tech, Seoul (KR)

( * ) Notice: Subject to any disclaimer, the term of this patent is extended or adjusted under 35 U.S.C. 154(b) by 226 days.

(21) Appl. No.: 12/458,075

(22) Filed: Jun. 30, 2009

(65) Prior Publication Data

US 2010/0257437 A1  Oct. 7, 2010

(30) Foreign Application Priority Data

Apr. 2, 2009 (KR) .................. 10-2009-0028576

(51) Int. Cl.
*G06F 11/00* (2006.01)

(52) U.S. Cl. ........................................ 714/6.1; 711/162

(58) Field of Classification Search ........................ None
See application file for complete search history.

(56) References Cited

U.S. PATENT DOCUMENTS

| | | | | |
|---|---|---|---|---|
| 7,330,997 B1 * | 2/2008 | Odom | .......................... | 714/6.23 |
| 2002/0107877 A1 * | 8/2002 | Whiting et al. | ............... | 707/204 |
| 2005/0114614 A1 * | 5/2005 | Anderson et al. | ............. | 711/162 |

* cited by examiner

*Primary Examiner* — Scott Baderman
*Assistant Examiner* — Jason Bryan
(74) *Attorney, Agent, or Firm* — Stein McEwen, LLP

(57) ABSTRACT

An apparatus for managing a data backup is disclosed. In accordance with the apparatus of the present invention, an integrity verification data randomly extracted according to a predetermined condition is used to facilitate a checking of an error that may exist in a backup data, and extracting and locating the integrity verification data are facilitated by using an index data, thereby minimizing a work time for verifying an integrity of the backup data.

12 Claims, 4 Drawing Sheets

APPARATUS FOR MANAGING DATA BACKUP

BACKGROUND OF THE INVENTION

1. Field of the Invention

The present invention relates to an apparatus for managing a data backup, and more particularly to an apparatus for managing a data backup wherein a verification of an integrity of the backup data is facilitated a work time required for the verification of the integrity is minimized.

2. Description of the Related Art

A conventional data backup system backs up the original data and restores the original data using the backup data when the original data is destroyed.

The data backup system uses a storage device supporting a magnetic tape or a disk as a storage medium to store the backup data.

While the storage medium such as the magnetic tape and the disk provides a certain level of reliability, the storage medium does not guarantee a perfect integrity of the backup data.

Particularly, when an error occurs in the storage medium, the data backup system cannot read the backup data resulting in being unable to restore the original data despite the existence of the backup data.

Therefore, the data backup system should check whether the original data can be restored, i.e. the integrity of the backup data before the actual backup data is necessary.

In order to verify the integrity of the backup data, the data backup system reads the backup data stored in the storage medium and transmits the same to a client computer. Thereafter, the data backup system receives a restoration result from the client computer to check whether the backup data is successfully restored by the client computer.

The Verification of the integrity of the backup data has following drawbacks.

The backup data has a size ranging from tens of gigabytes to hundreds of terabytes according to a backup environment. In addition, the backup data includes tens of files to tens of millions of files.

Considering the size and the number of files, it is practically impossible for the data backup system to read and transmit an entirety of the backup data to the client computer in order to verify the integrity.

Moreover, it is difficult to back up the data to the storage medium and to read the backup data at the same time. Therefore, it is preferable that the verification of the integrity of the backup data is carried out when the data is not being backed up by the data backup system.

Generally, because the data backup system carries out the backup during non-working hours, the data backup system should carry out the verification of the integrity of the backup data during working hours. However, when the data backup system reads and transmits the backup data to the client computer during the working hours, a processing of the client computer is affected.

Further, an administrator of the data backup system should carry out a management of the verification of the integrity such as checking that a restoration in the client computer is carried out properly in addition to the backup.

While the verification of the integrity is necessary, the conventional data backup system does not carry out the verification of the integrity due to the above-described drawbacks.

SUMMARY OF THE INVENTION

It is an object of the present invention to provide an apparatus for managing a data backup wherein an integrity verification data randomly extracted according to a predetermined condition is used to facilitate a checking of an error that may exist in a backup data, and wherein extracting and locating the integrity verification data are facilitated by using an index data, thereby minimizing a work time for verifying the integrity.

In order to achieve above-described object of the present invention, there is provided an apparatus for managing a data backup between a client computer and a storage device, the apparatus comprising: a backup data manager for managing a backup data stored in the storage device, the backup data including a plurality of files; a restored data condition manager for managing a condition for extracting a data to be restored from the backup data; a data extractor for extracting an integrity verification data satisfying the condition from the backup data; and a client computer interface for transmitting the integrity verification data to the client computer, wherein the condition includes a first extraction condition for extracting a temporary data from the backup data, and a second extraction condition for extracting the integrity verification data based on the temporary data extracted according to the first extraction condition, and the data extractor sorts the temporary data in a random order after extracting the temporary data from the backup data based on the first extraction condition, and extracts the integrity verification data from the sorted temporary data based on the second extraction condition.

It is preferable that the apparatus further comprises a state manager for managing an error of the data backup, and the client computer interface receives a restoration result data for the integrity verification data from the client computer, and the state manager manages the error of the data backup based on the restoration result data.

Preferably the state manager dynamically updates the condition based on the error of the data backup.

Preferably the backup data manager manages a list of an index data for the backup data, and the data extractor extracts the index data satisfying the condition from the list of the index data and extracts the integrity verification data from the storage device based on the index data extracted from the list.

Preferably the backup data includes a plurality of files, and the list includes the index data for each of plurality of files, and the integrity verification data includes one of the plurality of files corresponding to the index data extracted from the list.

It is preferable that the index data includes a position information on a location where the one of the plurality of files corresponding to the index data is stored, and an identification information of the one of the plurality of files corresponding to the index data.

Preferably the identification information is in a form of a metadata.

Preferably the backup data is stored using one or more backup sets including one or more volume blocks, the backup data manager manages an information on the one or more backup sets, the position information includes an identification information on one of one or more the backup sets including the one of the plurality of files corresponding to the index data, and an identification information on one of one or more the volume blocks included in the one of one or more the backup sets, and the data extractor extracts the index data satisfying the condition from the list of the index data, and the data extractor reads the one or more volume block corresponding to the extracted index data to extract the integrity verification data by referring to the information on the one or more backup sets and the position information included in the extracted index data.

It is preferable that the backup data includes a plurality of files, and the condition includes at least one of an identification information of the client computer, a type of the file to be restored, a maximum number of the files to be restored, a size of the file to be restored, a total size of the files to be extracted and a backup date.

It is preferable that the first extraction condition includes at least on of an identification information of the client computer, a type of the file to be restored, a size of the file to be restored and a backup date, and the second extraction condition includes at least one of a maximum number of the files to be restored and a total size of the files to be extracted.

It is preferable that the client computer interface transmits the integrity verification data to the client computer based on an integrity test execution period and a restoration path.

It is preferable that the restoration path includes a path within the client computer or a path of a device connected to the client computer.

DETAILED DESCRIPTION OF THE INVENTION

An apparatus for managing a data backup in accordance with the present invention will be described with reference to accompanied drawings.

Figure 1:
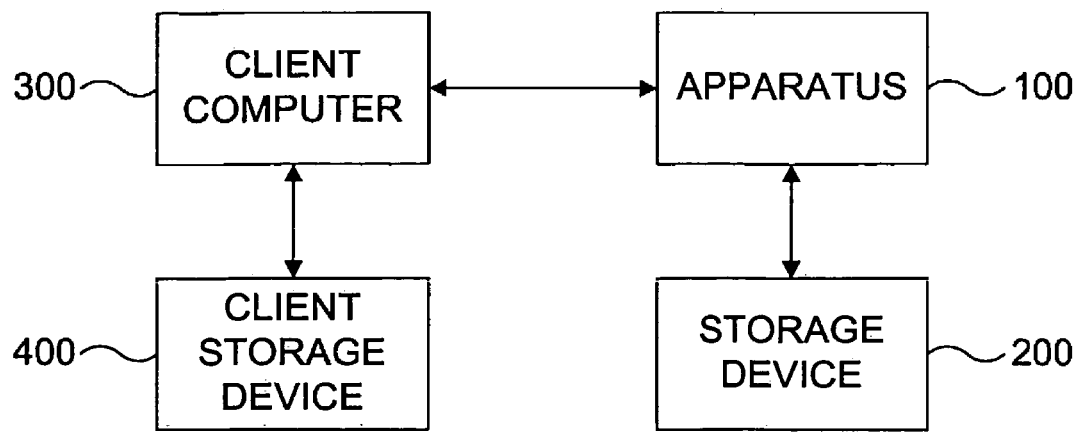
FIG. 1 is a block diagram exemplifying a system environment wherein an apparatus for managing a data backup in accordance with the present invention is applied.

FIG. 1 is a block diagram exemplifying a system environment wherein an apparatus for managing a data backup in accordance with the present invention is applied.

Referring to FIG. 1, an apparatus 100 for managing a data backup is disposed between a storage device 200 and a client computer 300.

The apparatus 100 manages whether the data backup between the storage device 200 and the client computer 300 is properly carried out. The apparatus 100 may receive a backup data from the client computer 300 and store the received backup data in the storage device 200.

The storage device 200 stores the backup data. The storage device 200 stores the backup data using a magnetic tape storage media or disk type storage media.

The client computer 300 generates and stores the backup data in the storage device 200. For instance, the client computer 300 transmits the backup data to the apparatus 100 and the apparatus 100 receives and stores the backup data in the storage device 200

A client storage device 400 is connected to the client computer 300 and locally stores a data.

Figure 2:
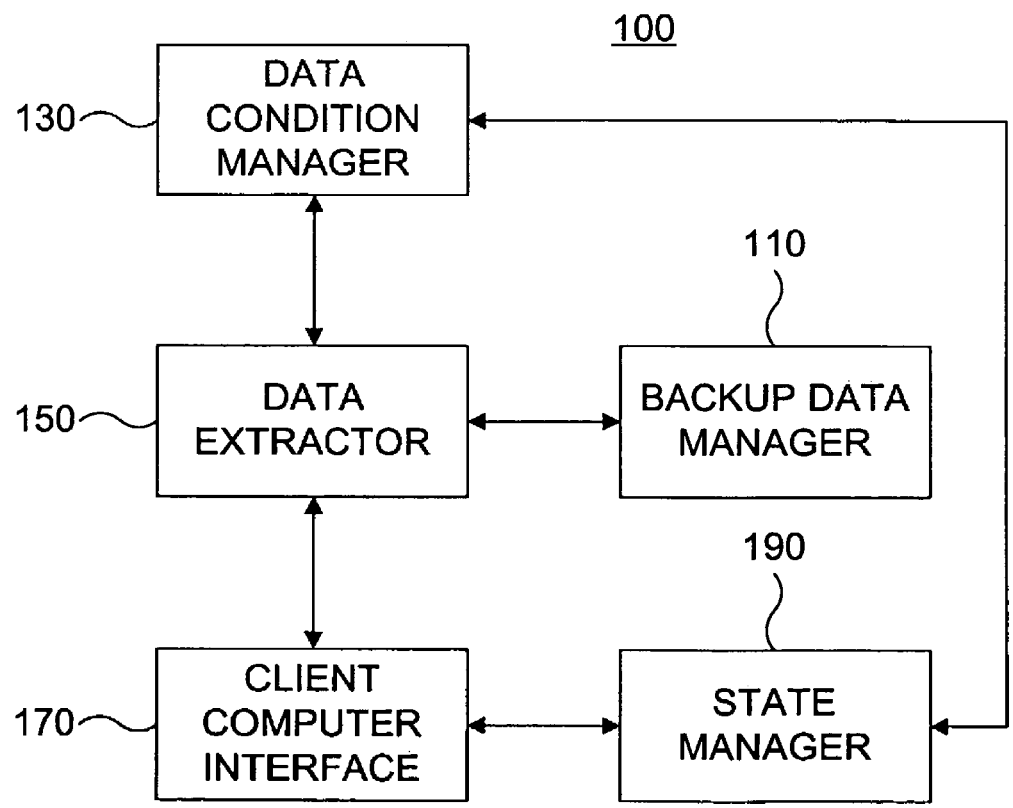
FIG. 2 is a block diagram exemplifying an apparatus for managing a data backup in accordance with the present invention.

FIG. 2 is a block diagram exemplifying an apparatus for managing a data backup in accordance with the present invention.

Referring to FIG. 2, the apparatus 100 for managing the data backup in accordance with the present invention comprises a backup data manager 110, a data condition manager 130, a data extractor 150 and a client computer interface 170. In addition, the apparatus 100 may further comprise a state manager 190 as shown in FIG. 2.

The backup data manager 110 manages the backup data stored in the storage device 200 of FIG. 1. Preferably, the backup data manager 110 manages a list of an index data of the backup data. The apparatus 100 may carry out an extraction of an integrity verification data based on the list of the index data.

The data condition manager 130 manages a condition for extracting a data to be restored from the backup data stored in the storage device 200 of FIG. 1.

When an entirety of the backup data is restored or when an identical portion of the backup data is restored for every restoration process, a reliability of verifying an integrity of the backup data is compromised.

Therefore, the apparatus 100 extracts the integrity verification data based on the condition for extracting the data to be restored from the backup data.

When the backup data includes a plurality of files, the condition may include at least one of "identification information of the client computer", "type of the file to be restored", "maximum number of the files to be restored", "size of the file to be restored", "total size of the files to be extracted" and "backup date".

When the backup data stored in the storage device is generated by a plurality of the client computers, the condition "identification information" may be used to extract the file generated by a certain client computer.

The condition "type of the file" may be used to extract a certain type of file from the backup data such as a general file, a mail server file, a database file including MS-SQL data and SyBase data.

The condition "maximum number of the files" represents a maximum number of the files to be restored. For instance, when the backup data includes 10,000,000, and the condition "maximum number of the files" is 1,000, a maximum of 1,000 files may be restored.

When the condition "size of the file to be restored" is set to be no less than 1 megabyte and no more than 10 megabytes, only the files having a size ranging from 1 MB to 10 MB are restored.

The condition "total size of the files to be extracted" sets a total size of the extracted files to be no larger than a certain size. For instance, when the condition "total size of the files to be extracted" is 1 gigabyte, the integrity verification data is extracted in a manner that the total size of the extracted integrity verification data does not exceed 1 gigabyte.

The condition "backup date" is used to limit a backup date of the backup data that is to be extracted to a certain period. For instance, when the condition "backup date" is set to "recent one week", only the backup data that is generated within past one week is restored.

On the other hand, the condition may include a first extraction condition and a second extraction condition.

The first extraction condition is for extracting a temporary data from the backup data. The first extraction condition may include "identification information of the client computer", "type of the file to be restored", "size of the file to be restored" and "backup date".

The second extraction condition is for extracting the integrity verification data from the temporary data. The second extraction condition may include "the maximum number of the files to be restored" and "total size of the files to be extracted".

The data extractor 150 extracts the integrity verification data that satisfies the condition of the data condition manager 130 from the backup data stored in the storage device.

When the condition includes at least one of "identification information of the client computer", "type of the file to be restored", "maximum number of the files to be restored", "size of the file to be restored", "total size of the files to be extracted" and "backup date", the data extractor 150 extracts the files that satisfies the condition as the integrity verification data.

In addition, when the condition includes the first extraction condition and the second extraction condition, the data extractor 150 extract the file satisfying the first extraction condition from the backup data as the temporary data. Thereafter, the data extractor 150 sorts the temporary data in a random order. Next, the data extractor 150 extracts the file satisfying the second extraction condition from the randomly sorted temporary data as the integrity verification data. For instance, when the temporary data includes one thousand files, one thousand files are sorted in the random order by the data extractor 150. Thereafter, from the randomly sorted one thousand files, $1^{st}$ to $100^{th}$ files that satisfy the second extraction condition are extracted as the integrity verification data. Since the temporary data is sorted in the random order, the extracted integrity verification data differs for every extraction thereof.

When the backup data manager 110 manages the list of the index data, the data extractor 150 extracts, from the index data included in the list, the index data that satisfies the condition. Thereafter, the data extractor 150 extracts the integrity verification data from the storage device based on the extracted index data.

When the backup data includes the plurality of files, the backup data manager 110 manages the list of the index data for each of the plurality of files included the backup data. The index data for each of the plurality of files may include a position information associate with a location where the file is stored and an identification information associated with the file. The position information may be a path information of the file stored in the storage device or a physical position information of the file. The identification information may have a form of a metadata associated with a type and a size of the file stored in the storage device. In addition, the position information and the identification information may be stored to be adjacent to each other or spaced apart from each other. In either case, the position information and the identification information may be combined to constitute the index data.

On the other hand, the backup data may be stored using one or more backup sets including one or more volume block.

When the backup sets are used, the backup data manager 110 may manage an information on the one or more backup sets.

When the backup data includes the plurality of files, the integrity verification data is at least one of the plurality of files corresponding to the index data satisfying the condition. When the backup data is stored by using the one or more backup sets including the one or more volume block, the data extractor 150 extracts the index data satisfying the condition. Thereafter, the data extractor 150 reads the volume block corresponding to the extracted index data from the storage device to extract the integrity verification data.

As described above, the index data includes the position information. The position information may include an identification information on the backup set to which the file corresponding to the index data belongs, and an identification information on the volume block wherein the file corresponding to the index data is stored.

The data extractor 150 may refer to the identification informations on the backup set and the volume block. The data extractor 150 may also refer to an information on the one or more backup sets. The data extractor 150 refers to the position information and the information on the one or more backup sets to read the volume block corresponding to the index data, thereby extracting the integrity verification data.

The client computer interface 170 transmits the integrity verification data extracted by the data extractor 150 to the client computer 300.

The client computer interface 170 may transmit the integrity verification data to the client computer 300 based on an integrity test execution period and a restoration path.

It is preferable that the integrity test execution period does not overlap with a period during which the storage device writes the backup data. Therefore, it is preferable that the client computer interface 170 transmits the integrity verification data to the client computer 300 while a load of the client computer 300 is relatively small and the storage device is not writing the backup data.

In addition, the restoration path may be a path within the client computer or a path of the client storage device connected to the client computer.

The reason that the restoration path is set to be the path of the client storage device is to minimize an effect on a database and a mail server in use when a database file and a data file of the mail server are restored.

The integrity test execution period and the restoration path may be stored in the apparatus 100 in advance. Alternately, the integrity test execution time and the restoration path may be dynamically assigned to be suitable for the data which is an object of an integrity test by an administrator of the apparatus 100 for managing the data backup or a management module of the apparatus 100 for managing the data backup.

The state manager 190 manages an error of the data backup between the storage device and the client computer.

After the client computer verifies the restored integrity verification data, the client computer generates a restoration result data.

When the client computer interface 170 receives the restoration result data from the client computer, the state manager 190 manages the error of the data backup based on the restoration result data. That is, the state manager 190 manages whether the error of the data backup in the client computer.

When the state manager 190 manages the error of the data backup, the data condition manager 130 update the condition based on the error of the data backup.

For instance, the data condition manager 130 may update the condition by adding the type of the file that has errors or the identification information of the client computer to the condition.

Figure 3:
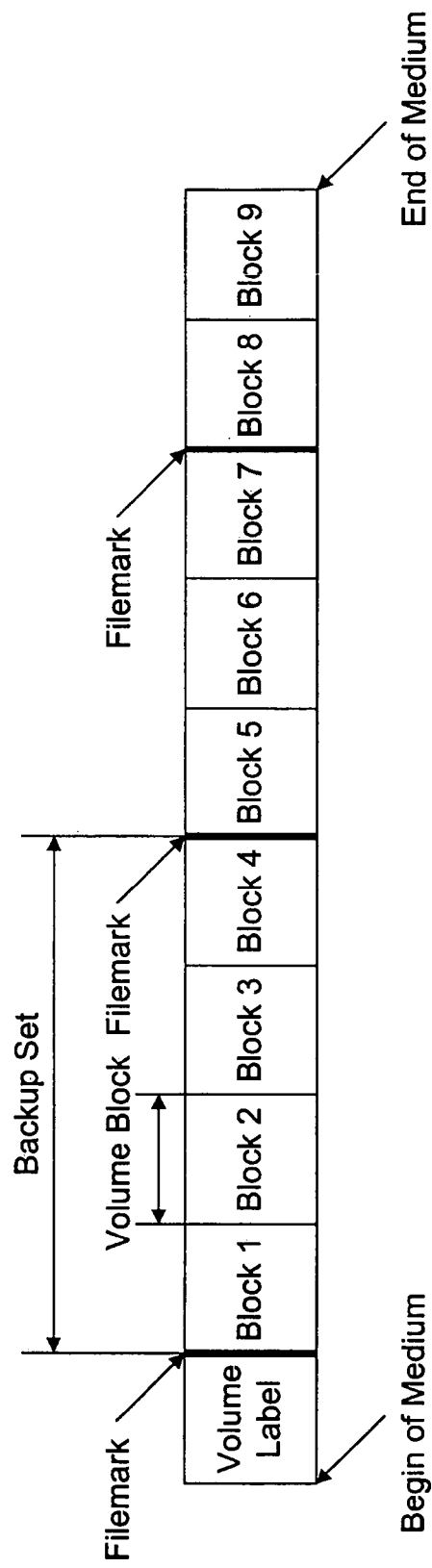
FIG. 3 is a diagram illustrating an exemplary structure for storing a backup data in a storage device of an apparatus for managing a data backup in accordance with the present invention.

FIG. 3 is a diagram illustrating an exemplary structure for storing the backup data in the storage device of the apparatus for managing the data backup in accordance with the present invention.

The backup data is stored in a storage medium in a form of a volume, and the volume includes the one or more backup sets. The volume is classified into a tape volume and a disk volume according to types of a storage medium, and FIG. 3 illustrates an example wherein the storage device 200 uses a magnetic tape as the storage medium.

Referring to FIG. 3, the backup data includes Volume Label, Backup Set and Filemark. The backup data also includes Begin of Medium field and End of Medium field.

Volume Label is written at a beginning of a tape volume. Volume Label includes a name of the tape volume and a data backup type.

The backup set is a set of data written in each session. Referring to FIG. 3, the backup set includes the one or more volume block. It is preferable that the data is written onto the magnetic tape in a block unit having a same size. FIG. 3 illustrates block 1 through block 9 written in the magnetic tape.

Referring to FIG. 3, one backup set includes block 1 through block 4. Another backup set may include block 5 through block 7. Yet another backup set may include block 8 and block 9.

Begin of Medium field is an identifier representing a beginning the tape volume.

Filemark is an identifier inserted after writing the data in the tape volume. Filemark is used in a reading of the data as well as subsequent writing of the data.

Filemark serves a role similar to End of file of a general file. That is, the data may be read by regarding the data between Filemarks as one backup set.

End of Medium field is an identifier representing a failure in writing data due to a insufficient space in the tape volume.

The magnetic tape is the storage medium which is only capable of a sequential access. Therefore, when the data is overwritten in a middle of the tape volume, the data after the overwriting data cannot be read. For instance, when the data is overwritten in Block 3 shown in FIG. 3, the data in Block 4 through Block 9 cannot be read.

While FIG. 3 depicts an example wherein the storage device 200 uses the magnetic tape as the storage medium, the storage medium may be a disk. The scheme for storing the backup data in the storage device is similar to that of the magnetic tape even when the storage medium is the disk.

However, the scheme for the disk differs from that of the magnetic tape in that Filemark is not used.

Figure 4:
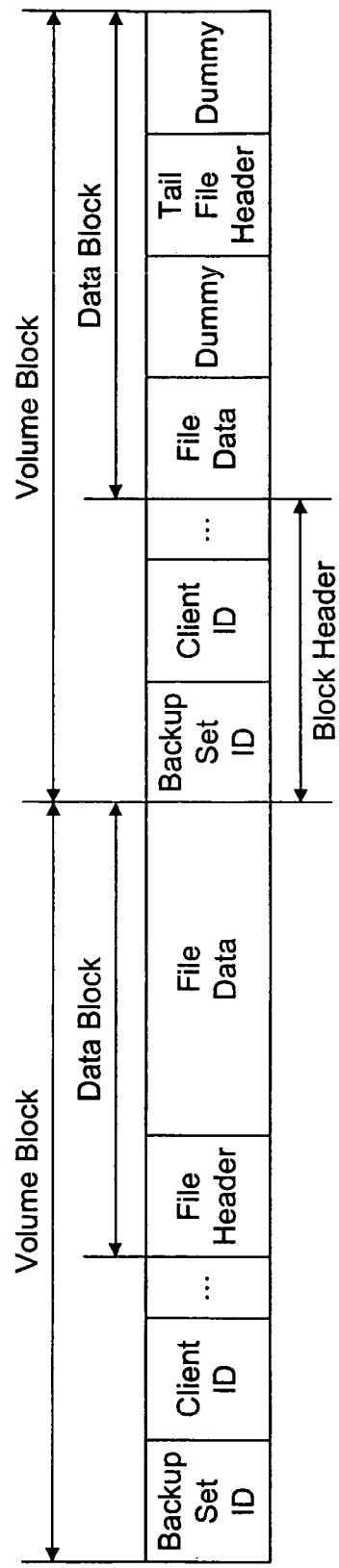
FIG. 4 is a diagram illustrating an example of a scheme for storing a data of a volume block in a storage device of an apparatus for managing a data backup in accordance with the present invention.

FIG. 4 is a diagram illustrating an exemplary structure for storing the data of the volume block in the storage device of the apparatus for managing the data backup in accordance with the present invention, wherein the volume block of FIG. 4 represents Block 1 through Block 9 shown in FIG. 3.

Referring to FIG. 4, the volume block includes a Block Header and a Data Block.

The Block Header includes a Backup Set ID field and a Client ID field. The reason that Block Header is written for each volume block is for a multiplexing operation. For instance, the Backup Set ID field may have a size of 16 bytes and the Client ID field may have a size of 32 bytes, and the Block Header may have a size of 1 kilobytes.

The Data Block may include a File Header and a File Data. The Data Block may also include a Dummy and a Tail File Header.

The File Data represents the data to be backed up, i.e. a content of the file, and the File Header and the Tail File Header represents informations on the file. Particularly, the Tail File Header represents the information required for restoring the file.

The Dummy is inserted in order to store the file in data blocks.

The data block may include both the File Header and the Tail File Header. However, the data block may include only one of the File Header and the Tail File Header when the size of the file is large.

Figure 5:
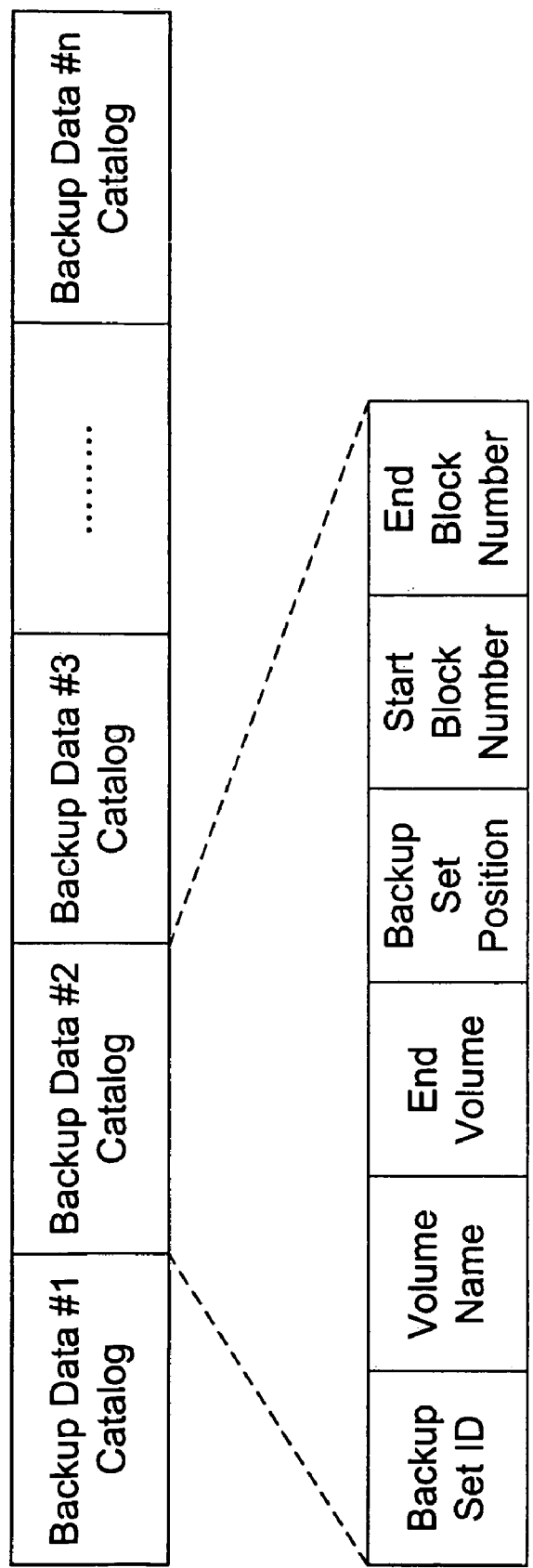
FIG. 5 is a diagram illustrating an exemplary configuration of a position information of an apparatus for managing a data backup in accordance with the present invention.

FIG. 5 is a diagram illustrating an exemplary configuration of the position information of the apparatus for managing the data backup in accordance with the present invention.

Each of Backup Data #1 Catalog through Backup Data #n Catalog shown in FIG. 5 represents the position information on the file included in the backup set. That is, the number of the position information is same as the number of the files included in the backup set.

When the plurality of files are written in the backup set, the position information of each of the plurality of files may refer to an information on the backup set as described below.

Referring to FIG. 5, the position information of each of the plurality of files includes a Backup Set ID field, a Volume Name field, an End Volume Name field, a Backup Set Position field, a Start Block Number field and an End Block Number field.

The Backup Set ID field represents an identifier for the backup set to which the file belongs.

The Volume Name field and the End Volume Name field represent names of a begin volume and an end volume of the volume block in the backup set to which the file belongs.

The Backup Set Position field represents a starting position of the backup set to which the file belongs. Specifically, the Backup Set Position field represents a position of Filemark inserted after Volume Label of the backup set.

The Start Block Number field represents the number of a first volume block of the volume blocks of the backup set to which the file belongs.

The End Block Number field represents the number of a last volume block of the volume blocks of the backup set to which the file belongs.

Figure 6:
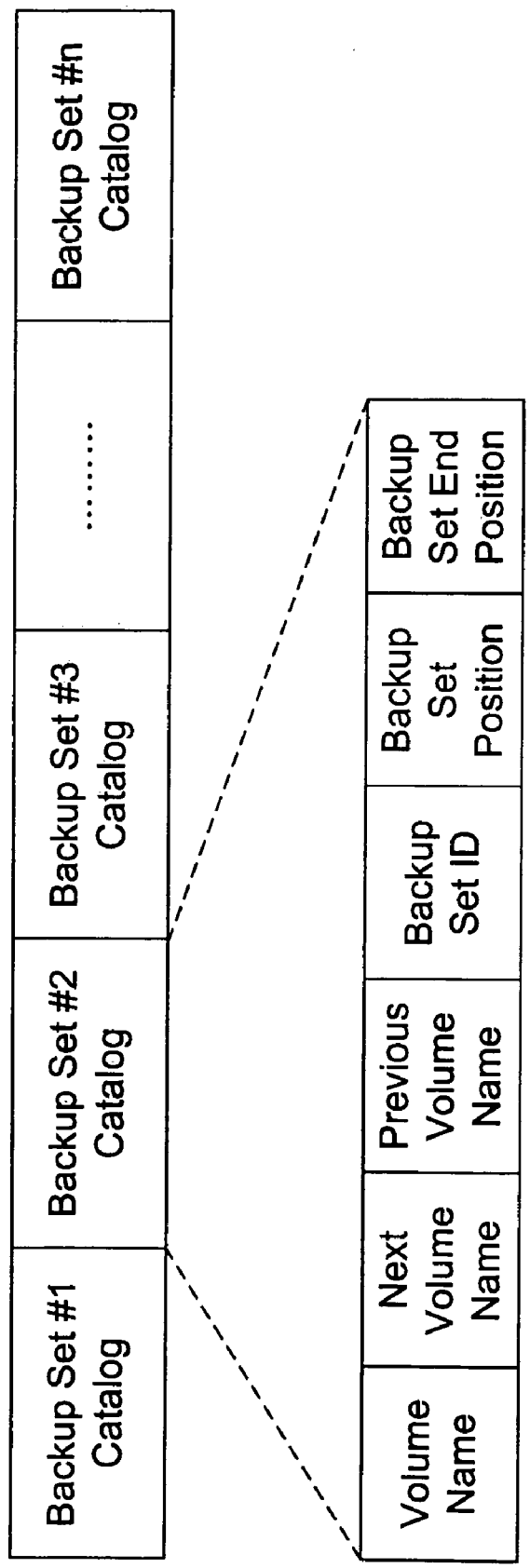
FIG. 6 is a diagram illustrating an exemplary configuration of an information on a backup set in an apparatus for managing a data backup in accordance with the present invention.

FIG. 6 is a diagram illustrating an exemplary configuration of the information on the backup set in an apparatus for managing a data backup in accordance with the present invention.

Each of Backup Set #1 Catalog through Backup Set #n Catalog shown in FIG. 6 represents the information on the backup set. That is, the number of the information on the backup set is same as the number of the backup sets.

Referring to FIG. 6, the information on the backup set includes a Volume Name field, a Next Volume Name field, a Previous Volume Name field, a Backup Set ID field, a Backup Set Position field and a Backup Set End Position field.

The Volume Name field represents a name of the volume wherein the backup set is stored.

The Next Volume Name field and the Previous Volume Name field represent names of the volume which are disposed before and after the volume wherein the backup set is stored, respectively.

The Backup Set ID field represents an identifier of the backup set.

The Backup Set Position field represents a starting position of the backup set to which the file belongs. Specifically, the Backup Set Position field represents a position of Filemark inserted after Volume Label of the backup set.

The Backup Set End Position field represents an ending starting position of the backup set. Specifically, the Backup Set End Position field represents a position of Filemark inserted at an end of the backup set.

The backup data manager 110 manages the position information in a manner that the number of the information is same as the number of the files. The backup data manager 110 may also manage the information on the backup set in a manner that the number of the information is same as the number of the backup sets. That is, it is preferable that the backup data manager 110 manages the information on the backup set separately instead of managing the information on the backup set included in the index data.

The data extractor 150 may extract the integrity verification data using the position information described with reference to FIG. 5 and the information on the backup set described with reference to FIG. 6.

That is, the data extractor 150 checks whether the file satisfies the condition using the identification information on the file included in the index data, and extracts the index data satisfying the condition.

Thereafter, the data extractor 150 refers to the position information and the information on the backup set to read the volume block corresponding to the index data extracted from the storage device 200. Therefore, the data extractor 150 may extract the integrity verification data corresponding to the extracted index data.

As described above, in accordance with the present invention, the integrity verification data randomly extracted according to the predetermined condition is used to facilitate the checking of the error that may exist in the backup data. In addition, extracting and locating the integrity verification data are facilitated by using the index data, thereby minimizing a work time for verifying the integrity.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus for managing a data backup between a client computer and a storage device, the apparatus comprising:
   a backup data manager for managing a backup data stored in the storage device, the backup data including a plurality of files;
   a restored data condition manager for managing a condition for extracting a data to be restored from the backup data;
   a data extractor for extracting an integrity verification data satisfying the condition from the backup data; and
   a client computer interface for transmitting the integrity verification data to the client computer,
   wherein the condition includes a first extraction condition for extracting a temporary data from the backup data, and a second extraction condition for extracting the integrity verification data based on the temporary data extracted according to the first extraction condition, and the data extractor sorts the temporary data in a random order after extracting the temporary data from the backup data based on the first extraction condition, and extracts the integrity verification data from the sorted temporary data based on the second extraction condition.

2. The apparatus in accordance with claim 1, further comprising a state manager for managing an error of the data backup, and wherein the client computer interface receives a restoration result data for the integrity verification data from the client computer, and wherein the state manager manages the error of the data backup based on the restoration result data.

3. The apparatus in accordance with claim 2, wherein the state manager dynamically updates the condition based on the error of the data backup.

4. The apparatus in accordance with claim 1, wherein the backup data manager manages a list of an index data for the backup data, and wherein the data extractor extracts the index data satisfying the condition from the list of the index data, and extracts the integrity verification data from the storage device based on the index data extracted from the list.

5. The apparatus in accordance with claim 4, wherein the backup data includes a plurality of files, wherein the list includes the index data for each of plurality of files, and wherein the integrity verification data includes one of the plurality of files corresponding to the index data extracted from the list.

6. The apparatus in accordance with claim 5, wherein the index data includes a position information on a location where the one of the plurality of files corresponding to the index data is stored, and an identification information of the one of the plurality of files corresponding to the index data.

7. The apparatus in accordance with claim 6, wherein the identification information is in a form of a metadata.

8. The apparatus in accordance with claim 6,
   wherein the backup data is stored using one or more backup sets including one or more volume blocks,
   wherein the backup data manager manages an information on the one or more backup sets,
   wherein the position information includes an identification information on one of one or more the backup sets including the one of the plurality of files corresponding to the index data, and an identification information on one of one or more the volume blocks included in the one of one or more the backup sets, and
   wherein the data extractor extracts the index data satisfying the condition from the list of the index data, and reads the one or more volume block corresponding to the extracted index data to extract the integrity verification data by referring to the information on the one or more backup sets and the position information included in the extracted index data.

9. The apparatus in accordance with claim 1, wherein the condition includes at least one of an identification information of the client computer, a type of the file to be restored, a maximum number of the files to be restored, a size of the file to be restored, a total size of the files to be extracted and a backup date.

10. The apparatus in accordance with claim 1, wherein the first extraction condition includes at least one of an identification information of the client computer, a type of the file to be restored, a size of the file to be restored and a backup date, and the second extraction condition includes at least one of a maximum number of the files to be restored and a total size of the files to be extracted.

11. The apparatus in accordance with claim 1, wherein the client computer interface transmits the integrity verification data to the client computer based on an integrity test execution period and a restoration path.

12. The apparatus in accordance with claim 11, wherein the restoration path includes a path within the client computer or a path of a device connected to the client computer.

* * * * *